(12) United States Patent
Lechner et al.

(10) Patent No.: US 6,285,879 B1
(45) Date of Patent: Sep. 4, 2001

(54) PROCESS AND SYSTEM FOR AUTOMATIC ROUTING

(75) Inventors: Gerhard Lechner, Vienna (AT); Helmut Rau, Germering (DE); Eckard Schöttle, Krailing (DE); Dirk Weiler, Germering (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/214,985

(22) PCT Filed: Jul. 25, 1997

(86) PCT No.: PCT/DE97/01576

§ 371 Date: Jan. 15, 1999

§ 102(e) Date: Jan. 15, 1999

(87) PCT Pub. No.: WO98/05178

PCT Pub. Date: Feb. 5, 1998

(30) Foreign Application Priority Data

Jul. 26, 1996 (DE) ................................. 196 30 399

(51) Int. Cl.[7] .............................. H04Q 7/20; H04B 1/38; H04B 1/00; H04M 3/42
(52) U.S. Cl. ................... 455/432; 455/432; 455/433; 455/445; 455/554; 455/555; 379/212
(58) Field of Search .................................... 455/432, 433, 455/436, 445, 554, 555, 560; 379/210, 211, 212

(56) References Cited

U.S. PATENT DOCUMENTS 5,828,959 * 10/1998 Soderbacka ........................ 455/445

FOREIGN PATENT DOCUMENTS

| 0 462 727 A2 | * | 12/1991 | (EP) | ................................. | H04Q/7/26 |
| WO 95/01074 | * | 1/1995 | (WO) | .............................. | H04Q/7/38 |
| WO 96/22000 | * | 1/1995 | (WO) | .............................. | H04Q/7/26 |
| WO 96/22000 | | 7/1996 | (WO) | . | |
| WO 96/21330 | * | 7/1996 | (WO) | .............................. | H04Q/7/26 |

OTHER PUBLICATIONS

Telcom Report 18, No. 6, (1995), Einen Schritt näher am—Personal Communicator, pp. 308–309.

* cited by examiner

Primary Examiner—Daniel Hunter
Assistant Examiner—Meless Zewdu
(74) Attorney, Agent, or Firm—Schiff Hardin & Waite

(57) ABSTRACT

In accord therewith, at least one identification number (PIID) for identifying a private network (PISN) for access to a first private branch exchange (PBX1) to a subscriber (BS) who was registered and a mobile subscriber telephone number (MSISDN) that was sent into the public mobile radio telephone network (PLMN), is stored in the public mobile radio telephone network (PLMN). A routing number (PRIN) is offered in the mobile radio telephone network on the basis of the incoming mobile subscriber telephone number (MSISDN) and is checked with reference to the stored identification number (PIID) as to whether the call destination lies in the area of a private branch exchange (PBX2) of the same private network (PISN) to which the first private branch exchange (PBX1) belongs. When this is the case, routing information (RIN) that define the call destination are sent—after clear down of the call in the public mobile radio telephone network—to the first private branch exchange (PBX1) that subsequently sets up the connection to the call destination in the private network (PISN) on the basis of the received routing information (RIN).

15 Claims, 6 Drawing Sheets

PROCESS AND SYSTEM FOR AUTOMATIC ROUTING

BACKGROUND OF THE INVENTION

The invention is directed to a method and to a system for routing in the connection setup for calls between a first subscriber and a second subscriber who moves between coverage areas of mobile switching centers of a public mobile radio telephone network and areas of private branch exchange devices of one or more private networks.

A public mobile radio telephone network such as, for example, the international mobile radio telephone network according to the GSM standard (Global System For Mobile Communication) offers, as known, mobile subscriber telephone services, data services and additional services that, for example, are also known from the ISDN network (Integrated Services Digital Network) and can be connected to further networks, for example the public telephone network (PSTN) or the ISDN network or some other line-bound network. Connections from and to other public mobile radio networks are also supported. The GSM mobile radio telephone network is a digital radio communications system cellularly constructed of a great number of radio cells. Each radio cell is thereby serviced by a base transmission-reception station that respectively sets up the connections to the mobile stations of the subscribers via the air interface. One or more base transmission-reception stations are managed by a base station controller.

One or more base station controllers are respectively connected to a mobile switching center that assumes the switching-oriented functions for a specific coverage area in the mobile radio telephone network. The switching-oriented functions include routing, i.e. the selection of routes, and the setup of connections for signaling and for call-through connection. Over and above this, the mobile switching center implements specific mobile radio telephone functions that derive from the mobility of the subscribers. Included here is the mobility administration of the mobile subscribers in the respective coverage area. The mobile switching center has a subscriber data base allocated to it in which subscriber data and location information for the subscribers that are in the coverage area are stored. The subscriber data base, for example, assumes functions of call handling, of connection setup and, in particular, of location registration. A location area identity according to the GSM standard is usually entered into the subscriber data base for the mobile subscriber.

The article "Einen Schritt Naher am Personal Communicator", telcom report 18, 1995, pages 308–309 discloses that wire-bound subscribers, for example ISDN subscribers, who are connectible via private branch exchanges be serviced by the mobile switching center—in addition to mobile radio telephone subscribers—in a combined operating mode. Connections thus arise between mobile switching centers of the public mobile radio telephone network and private branch exchange equipment of one or more private networks. For example, a number of locations of a company or of a number of companies are connected to one another in the private network (corporate network). The networks are not treated equally at the present time in the cooperation of the private network with the public mobile radio telephone network, i.e. the one network is respectively used only as access network for the other network. What this means in view of the routing given calls that relate to subscribers who can move between mobile radio telephone network and private network or within the respective network is that the routing for a call must be conducted via the public mobile radio telephone network in the call setup when originating private branch exchange equipment—to which the call is routed because of the selected telephone number—and destination private branch exchange equipment—at which the called subscriber can be reached or a substitute destination is deposited for him—lie in the same private network. Since the private branch exchange equipment are usually networked with one another, the connection to be set up via the public mobile radio telephone network does not represent an optimum method for routing.

It is therefore an object of the present invention to specify a method and a system for optimized routing between private branch exchange equipment of a private network supported by the public mobile radio telephone network. With respect to the method, this object is inventively achieved by the features of patent claim 1, and is achieved with respect to the system by the features of patent claim 13. Developments of the invention are recited in the subclaims.

In accord therewith, at least one identification number for the identification of a private network for access to a first private branch exchange equipment from which a call to a subscriber was registered and a mobile subscriber telephone number was transmitted into the public radio telephone network is stored in the public mobile radio telephone network. A routing number is offered in the mobile radio telephone network on the basis of the incoming mobile radio telephone subscriber telephone number and is checked with respect to the stored identification number to see whether the call destination lies in the area of a private branch exchange equipment of the same private network to which the first private branch exchange equipment belongs. When this is the case, routing information that define the call destination are sent—after cleardown of the call in the public mobile radio telephone network—to the first private branch exchange equipment that subsequently sets up the connection to the call destination on the basis of the received routing information in the private network.

As a result of the method and the system according to the invention, the public mobile radio telephone network supports an optimum routing in the connection setup within the private network when the originating private branch exchange equipment (home private branch exchange equipment) at which the call is registered for the call subscriber and the destination private branch equipment (visitor private branch exchange equipment) in which the call destination lies when, for example, the called subscriber is booked there or a substantive destination is registered for him, lie in the same private network. A complicated routing via the public mobile radio telephone network is avoided in the connection setup between originating private branch exchange equipment and destination private branch exchange equipment. The advantage of the inventive method or, respectively, system is also comprised therein that the call forwarded to the public mobile radio telephone network because of a mobile radio telephone subscriber telephone number is in turn cleardown via the network-overlapping interface between private network and mobile radio telephone network before the routing is setup between the private network from the originating private branch exchange equipment to the destination private branch exchange equipment on the basis of the routing information that have been communicated. The result is a lower time requirement in the connection setup on the basis of an optimized routing as well as a lower load on the network equipment effected by the routing in the public mobile radio telephone network.

According to a development of the invention, a routing number is offered in the public mobile radio telephone network, this at least comprising an identification number for identifying the private network in which the private branch exchange equipment of the call destination lies. It is advantageous when the routing number additionally contains an identification number for identifying the private branch exchange equipment of the call destination and an identification number for identifying the connection port of the private branch exchange equipment.

It is also advantageous when the routing information employed for the connection setup between the private branch exchange equipment of the same private network comprise an identification number for identifying the private branch exchange equipment of the call destination and an identification number for identifying the connection port of the private branch exchange equipment.

According to another development of the invention, a location information that indicates how the subscriber can be reached in the area of a private branch exchange equipment of the private network is stored and is employed as routing number for a comparison to the stored identification number with respect to identity of the private network for the first private branch exchange equipment and for the private branch exchange equipment that registers the called subscriber.

According to an alternative development of the invention, the routing number, due to a call redirection, is employed for comparison to the stored identification number in view of the identity of the private network for the first private branch exchange equipment and for the private branch exchange equipment of the call destination.

According to alternative developments of the invention, the comparison of the routing number to the identification number is implemented by a service control unit of an intelligent network that is linked into the public mobile radio telephone network by connection to at least one mobile switching center or is implemented by a mobile switching center that registers the access to the first private branch exchange equipment. When the comparison yields an identity of the private network for the private branch exchange equipment, the routing information are transmitted from the mobile switching center to the private branch exchange equipment via the network-overlapping interface.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
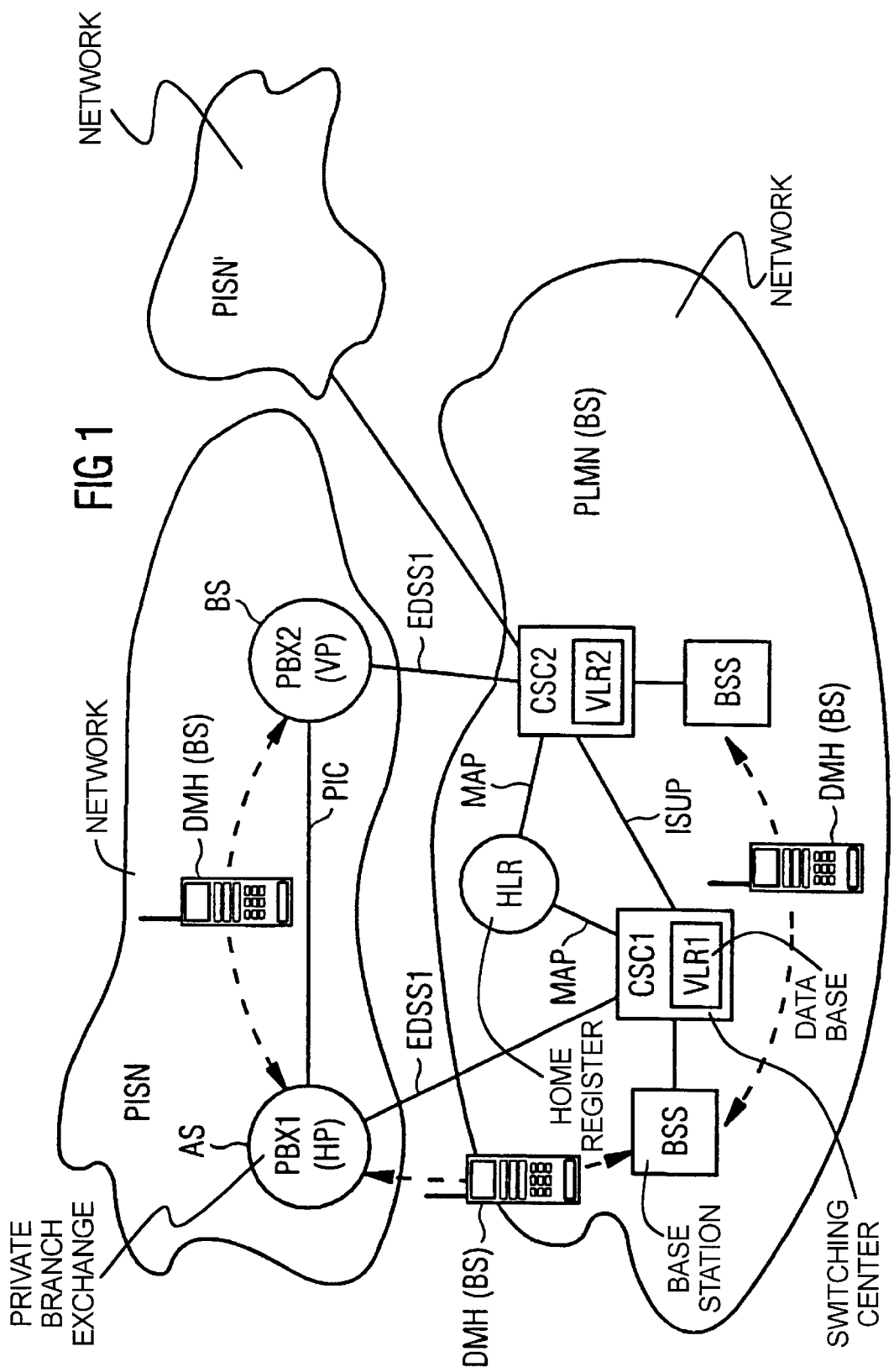
FIG. 1 depicts a block circuit diagram showing the configuration of a private network and a of a public mobile radio telephone network with mobile subscribers that, together with their radio telephone subscriber stations, moved between the networks and/or within the networks.

In a block circuit diagram, FIG. 1 shows the structure of private networks PISN, PISN' and of a public mobile radio telephone network PLMN to which the private networks PISN, PISN' are connected via interfaces for supporting the mobility of subscribers who can move between the networks and/or within the respective network with their radio telephone subscriber stations DMH. The public mobile radio telephone network PLMN, for example, is a digital, cellularly constructed radio communication system according to the GSM standard that is composed of a radio-oriented subsystem, of a switching-oriented subsystem and of an administration and maintenance subsystem. The radio-oriented subsystem comprises a base station system BSS with base transmission/reception stations that are distributed over the radio cells of the entire coverage area, a plurality of base station controllers as well as subscriber stations that—in the present example according to FIG. 1—are fashioned as combined radio telephone subscriber station DMH—dual mode radio telephone subscriber stations. The radio telephone subscriber station DMH thereby enables a wireless linking of a mobile subscriber BS via the air interface 2, for example, a range-limited cordless system, for example the standardized DECT cordless system (digital enhanced cordless telecommunication system), and to a public radio telephone communication system, for example the internationally standardized GSM mobile communication system.

The mobile subscriber BS can be reached with his dual mode radio telephone subscriber station DMH and, for example, the workplace via the DECT cordless system when he is automatically registered at a location of the private network PISN (private integrated service network) in the area of a private branch exchange means PBX1, PBX2 (private integrated service network exchange) and can be reached out for example on business trips, via the public GSM mobile communication system when he is registered in the coverage area of a mobile switching center CSC1, CSC2. The base station controllers of the base station system BSS assume the transmission and control functions in the radio coverage and connect the base station system to the switching-oriented subsystem that, among other things comprises a plurality of mobile switching centers CSC1, CSC2 . . . and subscriber data bases VLR1, VLR2, HLR . . . . The present example shows two mobile switching centers CSC1 and CSC2 that offer the call control functions. The mobile switching centers CSC1 and CSC2 thereby assume switching-oriented tasks such as selection of the routes and set up of per load and signaling connections, as well as mobile radio telephone-specific functions such as, for example, the mobility administration of the mobile subscribers. The subscriber data basis in the mobile telephone network are composed of one or more home registers HLR and of a plurality of visitor registers VLR1, VLR2 . . . . A decentrally arranged visitor register VLR1, VLR2 is allocated to each mobile switching center CSC1, CSC2 in order to register and service the subscribers residing in the coverage area of the mobile switching. For location registration, subscriber data and location information for the mobile subscribers are stored in the visitor registers VLR as semi-permanent data that are only necessary for the duration of the residency in the respective coverage area. A location area identity according to the GSM standard is usually deposited as location information for the subscribers moving in the GSM mobile radio telephone network in order to have their subscriber data available for the call handling. The home register HLR serves as central subscriber data base in which all relevant data are registered for the mobile subscriber. Among other things, the services respectively useable for the mobile subscriber are also entered.

Signaling functions between the equipment of the switching-oriented subsystem or, respectively, between the equipment of the switching-oriented subsystem and the base station system BSS are utilized for the connection setup and for the call handling in the mobile radio telephone network PLMN. Connections that proceed between a mobile subscriber and another subscriber in a line-bound telephone network (PSTN) or in some other line-bound fixed network (for example ISDN) or a mobile subscriber of its own or of some other mobile radio telephone network are thereby handled according to the central signaling system No. 7 (CCS7). The central signaling system CCS7 avails itself of a mobile radio telephone-specific user part MAP that controls the communication between the mobile radio telephone equipment network and of an ISDN user part ISUP that offers the signaling functions at the interface of the mobile radio telephone network PLMN to the fixed network ISDN. Whereas the MAP functions mainly relate to the information exchange between the subscriber data bases VLR1, VLR2, HLR, the user part ISUP is also employed on the connecting lines between the mobile switching centers CSC1, CSC2. For example, the ISUP functions are required given a handover after the connection handover from a first mobile switching center to a second mobile switching center.

A further signaling system EDSS1 that enables the communication at the interface between network PISN with the private branch exchange equipment PBX1, PBX2 and the public mobile radio telephone network PLMN with the mobile switching centers CSC1, CSC2 is utilized in addition to the central signaling system No. 7. A wire-bound ISDN subscriber can also be connected by an ISDN basic connection to the private branch exchange means PBX1 or, respectively, PBX2 and can be connected from the latter directly to the mobile switching center CSC1 or, respectively, CSC2. Mobile as well as wire-bound subscriber stations can be connected to the mobile switching center CSC1 or, respectively, CSC2 regardless of the respective standard on the air interface—for example GSM, DECT, CDMA (code-division multiplex access). The private branch exchange means PBX1 and PBX2 of the private network PISNR, for example reachable at the mobile switching centers CSC1 and CSC2 of the public mobile radio telephone network PLMN via the signaling system EDSS1. It is thereby also possible to connect a plurality of private branch exchange means to a mobile switching center. Let it be assumed that the private branch exchange means PBX1 lies at a first location of a company and the private branch exchange means PBX2 lies at a second location of a company and are networked with one another within the private company network via a connection PIC that, for example is a line-bound connection. A further private network PISN' that, for example, comprises a similar or identical structure as the private network PISN can also be connected to the mobile radio telephone network PLMN.

The mobile subscriber BS can be reached via their combined radio telephone subscriber station DMH in the private network PISN via a DECT base station and can be reached in the public mobile radio telephone network PLMN via the GSM base transmission-reception station. The mobile subscribers with their radio telephone subscriber station DMH move between the coverage areas of the mobile switching centers and the areas of the private branch exchange equipment. In addition to the two private branch exchange means PBX1 and PBX2 shown in FIG. 1, of course, further private branch exchange means can be present in the private network PISN that is equipped with private branch exchange equipment that support the DECT standard in the present example. Let it be assumed for the present example that the private branch exchange means PBX1 forms the home private branch exchange means HP to which the calls for the mobile subscriber BS in the private network are routed on the basis of his telephone number and the private branch exchange means PBX2 forms the visitor private branch exchange means VP in whose area the call destination lies. For example, the call destination in the private network is thereby defined by a call redirection activated by the subscriber BS or can be recognized based on a location information stored in the public mobile radio telephone network that identifies the current location. The call redirection, for example, can be input via a wire-bound subscriber station available to the subscriber BS. The call destination, for example, can be a calling means (mailbox) or a destination subscriber, for example, secretary, that can be reached at the private branch exchange means PBX 2 via a wire-bound subscriber station or via a mobile radio telephone station, for example DECT station.

The call is initiated by a A-subscriber AS of a wire-bound, private or public network or of a mobile radio telephone network by dialing a telephone number belonging to the called subscriber BS on the basis whereof a connection is setup to the private branch exchange means PBX1 (home private branch exchange means HP). The telephone number is the subscriber telephone number of the B-subscriber BS whose call destination lies in the area of the private branch exchange means PBX2 (visitor private branch exchange means VP). The called subscriber BS is either booked in the same private network PISN, for example at a different company location, in the private branch exchange means PBX 2 or the call redirection to that location has been activated. As an alternative to the radio telephone subscriber station BMH, the mobile subscriber can also employ standard GSM mobile station for the reception and transmission of the calls in the GSM mobile communication network as well as a wire-bound subscriber stations for the reception and sending of the calls in the private network. In the latter instance, the mobile subscribers manually log onto the wire-bound connections of the private branch exchange means PBX1 and PBX2 of the private network PISN. Via the signaling system EDSS1, the private branch exchange means report in a message to the mobile switching centers as soon as an access onto a private branch exchange means has ensued.

Figure 2:
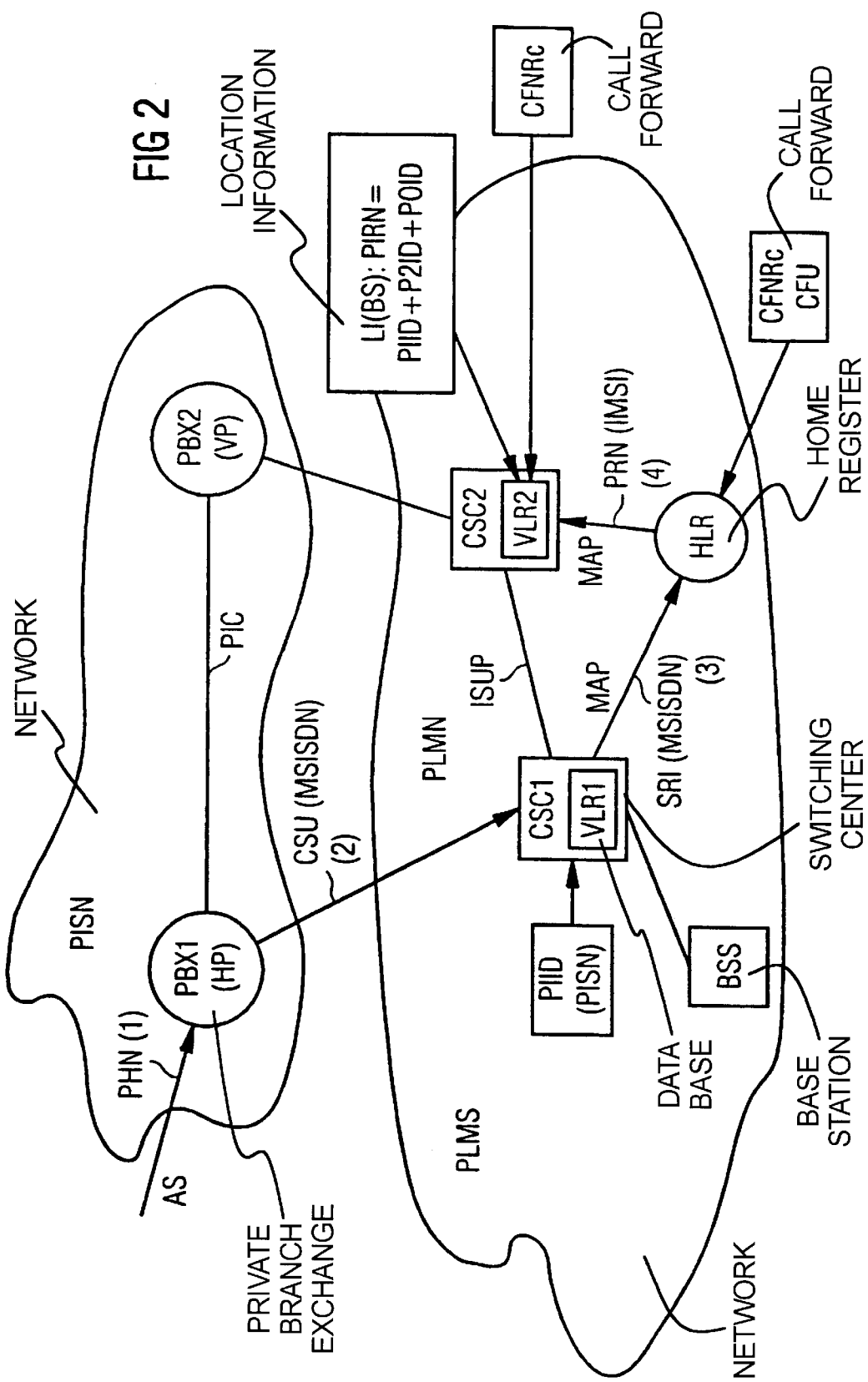
FIG. 2 depicts a block circuit diagram showing the execution of the routing for a call registered in the private network for a call subscriber that is directed into the public mobile radio telephone network.

FIG. 2 shows the block circuit diagram of the execution for routing for a call that, initiated by the subscriber AS and due to the selected telephone number PHN, proceeds (1) to the private branch exchange means PBX1 in the private network PISN. The telephone number PHN identifies the home private branch exchange means HP responsible for the destination subscriber BS which normally services him. When the destination subscriber is not in the area thereof at the moment—which can be recognized based on an unsuccessful paging according to the DECT method or on the basis of a call redirection manually activated by the subscriber BS at a wire-bound subscriber station—the telephone number PHN is replaced by a mobile radio telephone subscriber telephone number MSISDN as new call destination. A connection to the public mobile radio telephone network PLMN is set up on the basis of the mobile radio telephone subscriber telephone number MSISDN. The connection setup from the private network PISN to the public mobile radio telephone network PLMN ensues via the interface between the private branch exchange means PBX1 and the mobile switching center CSC1, so that a message CSU (call setup) with the mobile radio telephone subscriber telephone number MSISDN as message content is transmitted (2). The mobile switching center CSC1 stores identification number PIID for the access to the private branch exchange means PBX1 in order to identify the private network PISN in which the private branch exchange means PBXI registering the call lies.

The home register HLR is asked about the location area of the destination subscriber via the mobile specific user part MAP by the visitor register VLR1 linked to the mobile switching center CSC1. To this end, the mobile subscriber telephone number MSISDN is transmitted to the home register HLR (3) in a message SRI (send routing info). All subscriber data of the mobile subscriber are stored in the home register HLR, this also including the address of the visitor register in whose area the destination subscriber is located at the moment. Over and above this, an unconditional call forwarding CFU (call forwarding unconditional) or a call forwarding CFNRc (call forwarding on mobile subscriber not reachable) given an unreachable subscriber can be entered in the home register for the subscriber BS recognizable based on the mobile radio telephone subscriber MSISDN in the PLMN. Except given the unconditional call forwarding CFU, which involves an immediate reaction by the home register HLR—as described later, the home register HLR first requests (4) a route number from the visitor register VLR2 in a message PRN (provide roaming number) that contains an international subscriber identifier IMSI (International Mobile Subscriber Identity) stored in the home register HLR. The message PRN is thereby transmitted between the home register HLR and the visitor register VLR2 according to the mobile radio telephone-specific user part MAP.

Figure 3:
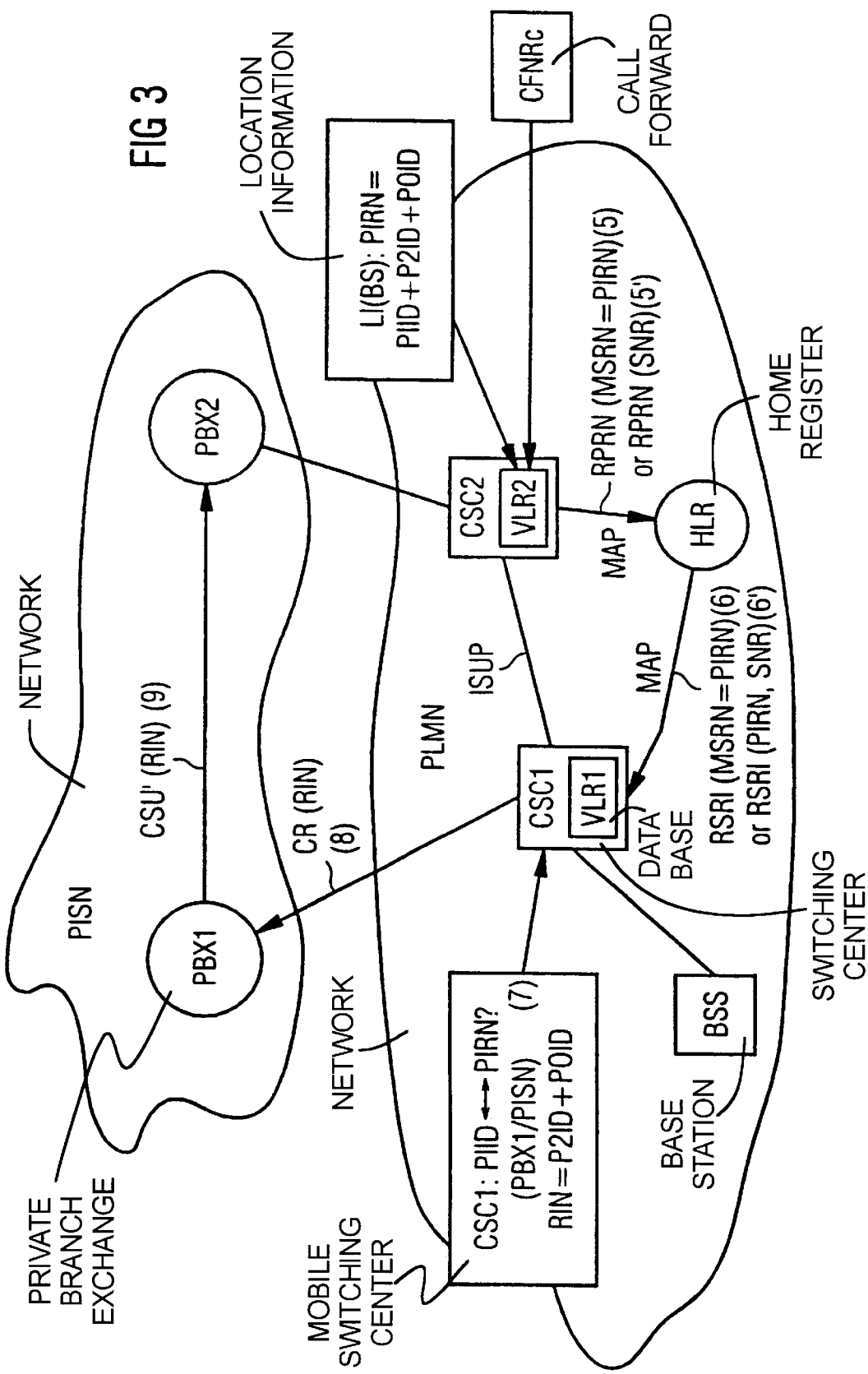
FIG. 3 depicts a block circuit diagram showing the execution of the routing in the call setup to a call destination that lies in the same private network.

When the call subscriber BS is currently in the coverage area of a mobile switching center, i.e. in the radio coverage area of the public mobile radio telephone network, a location area identify for him is stored in the visitor register, whereas a different location information is entered in the visitor register instead of this location area identity when the called subscriber BS is located in the area of a private branch exchange means of the private network. For the former case to be considered first, the call forwarding CFNRc is entered in the visitor register VLR2 with an information that the call destination of the call forwarding lies in the private network PISN. For the second case under consideration, a routing number PRIN is stored as location information LI for the subscriber BS, this routing number PRIN indicating how the B-subscriber can be reached in the private network PISN via the private branch exchange means PBX2 in which he is registered at the moment. The routing number PIRN entered in the visitor register VLR2 is preferably composed of a telephone number, the one identification number PIID for identifying the private network PISN, an identification number P2ID for identifying the private branch exchange means PBX2 of the call destination and an identification number POID for identifying the connection port of the private branch exchange PBX2 to which the B-subscriber is connected. At least the identification number PIID for identification of the private network PISN is required, advantageously supplemented by the identification P2ID for identifying the private branch exchange means PBX2 of the call destination. In a block circuit diagram, FIG. 3 shows the course for routing from the public mobile radio telephone network PLMN back into the private network PISN in that a direct connection is setup between the private branch exchange means PBX1, and the private branch exchange means PBX2. On the basis of the location information LI entered for the B-subscriber or on the basis of the call forwarding CFNRc entered for the B-subscriber, a message RPRN (result provide roaming number) is transmitted from the visitor register VLR2 as reply to the request of the home register HLR. In the former instance, the message RPRN contains the routing number PIRN as path number MSRN—according to the mobile radio telephone-specific user part MAP-(5), whereas an information SNR (subscriber not reachable) that signals the non-reachability of the subscriber is transmitted (5') in the latter instance. This has been previously determined via the base transmission-reception station responsible for the subscriber BS when, for example, the radio telephone subscriber station of the subscriber BS is in its off condition (detach status). As response to the request to determine the current location area of the called subscriber, the home register HLR sends the routing number PRIN back (6) to the visitor register VLR1 or, respectively, to the mobile switching center CSC1 as path number MSRN (mobile subscriber roaming number) in a message RSRI (result send routing info)—according to the mobile radio telephone-specific user part MAP. When call forwarding is activated, the message RSRI likewise contains the routing number PIRN and additionally contains the information SNR (6'). For the aforementioned case of call forwarding CFU, the home register HLR generates and sends the message RSRI with the routing number PRIN and an information that the call destination lies in the private network PISN because of the call forwarding, generating and sending this immediately after recognition of this telecommunication service.

On the basis of the routing number PRIN that has arrived and on the basis of the registered identification number PIID, a determination is made in the mobile radio telephone network PLMN by the mobile switching center CSC1 as to whether the private branch exchange means PBX1 registering the call from the calling subscriber AS and the private branch exchange means PBX2 responsible for the call destination are arranged in the same private network PISN. The identification number PIID stored in the mobile switching center CSC1 as a result of the subscriber access to the private branch exchange means PBX1 agrees with the identification number PIID received in the routing number PIRN, so that the identity of the private network PISN for the two private branch exchange means is determined by the mobile switching center CSC1 by the number comparison. After analysis of the routing number PRIN that has arrived and given the presence of the identity, the mobile switching center CSC1 supplies routing information RIN that is composed at least of the identification number P2ID for identifying the private branch exchange means PBX2 of the call destination supplemented by the identification number POID for identifying the appertaining connection port (7).

As reply to the beginning of the connection setup, the routing information RIN are returned to the private branch exchange means PBX1 (8) in a message CR (call release). The call registered for the called subscriber BS and received on the basis of the mobile subscriber telephone number (MSISDN) is cleared down in the public mobile radio telephone network PLMN with the message CR. The private branch exchange means PBX1 at which the call from the subscriber AS was registered sends a message CSU' for connection setup (call setup) that proceeds through the private branch exchange means PBX2 of the call destination (9) via the line connection. The connection setup ensues on the basis of the routing information RIN received from the mobile radio telephone network PLMN that form the content of the message CSU'. The routing is thus realized within the private network PISN between the private branch exchange means PBX acting as home private branch exchange means and the private branch exchange means PBX2 acting as visitor private branch exchange means without the connection having to be setup over the public mobile radio telephone network PLMN and having to be maintained during the call. The call can already be in turn prematurely cleared down in the mobile radio telephone network PLMN as soon as the routing information RIN has been handed over to the original private branch exchange means effected by the call in order to implement the connection setup from there to the call destination within the private network PISN, i.e. to the called B-subscriber or to a substitute destination.

Figure 4:
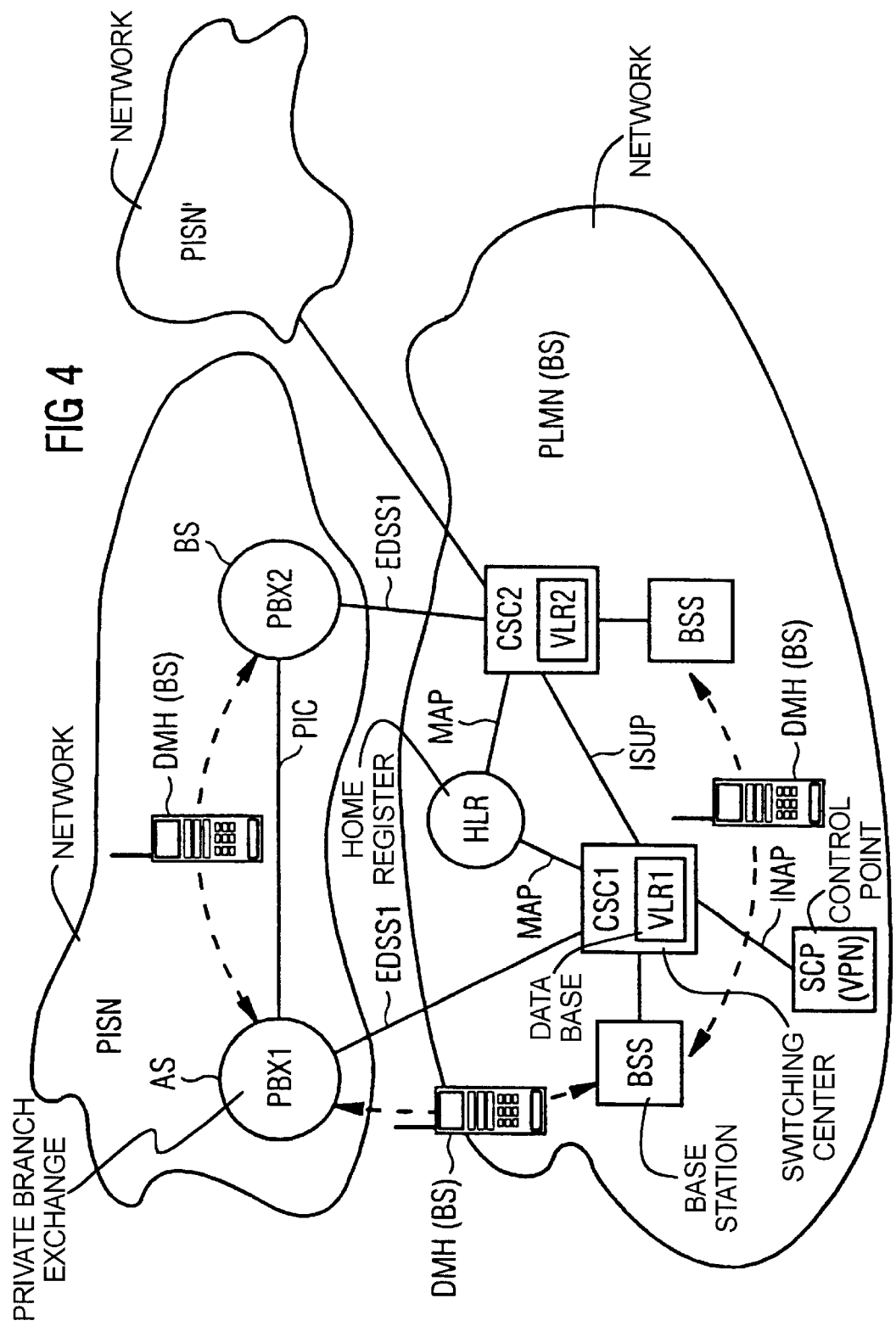
FIG. 4 depicts a block circuit diagram showing the configuration according to FIG. 1 with a service control unit of an intelligent network additionally linked into the mobile radio telephone network.

The block circuit diagram in FIG. 4 corresponds to the block circuit diagram according to FIG. 1 supplemented by a service control unit SCP (service control point) of an intelligent network. The service control point SCP is linked into the public mobile radio telephone network PLMN by connection to at least one mobile switching center, the mobile switching center CSC1 in the present example. The service control point SCP represents a central point for controlling the switching and service functions of service switching points. The mobile switching centers in the public mobile radio telephone network thereby correspond to the service switching points in the intelligent network. The service control point SCP represents an intelligent data base with which new services can be introduced into the mobile radio telephone network in a flexible way or, respectively, with which services of the intelligent network can be used by the mobile subscribers of the mobile radio telephone network. The service control point SCP is connected to the respective mobile switching center via a network-specific application part INAP (intelligent network application part). The information about the identity of the private network PISN can be stored in the service control point SCP of the mobile radio telephone network PLMN. The service contro point SCP thereby allocates a respective identification number for identification of the respective private network to an identification number identifying the private branch exchange means for every private network. The service control point SCP can thereby be quasi-interpreted as part of a virtual private network VPN in order—for example, from the number area of the mobile subscriber telephone numbers assignable in the mobile radio telephone network PLMN— to place the identification number of the private branch exchange means unambiguously inter-relationship to the identity of the respective private network. This means that, for example, on the basis of the identification number for the private branch means PBX1 registered in the mobile switching center CSC1, the service control point SCP can identify the private network to which the private branch exchange means PBX1 belongs.

Figure 5:
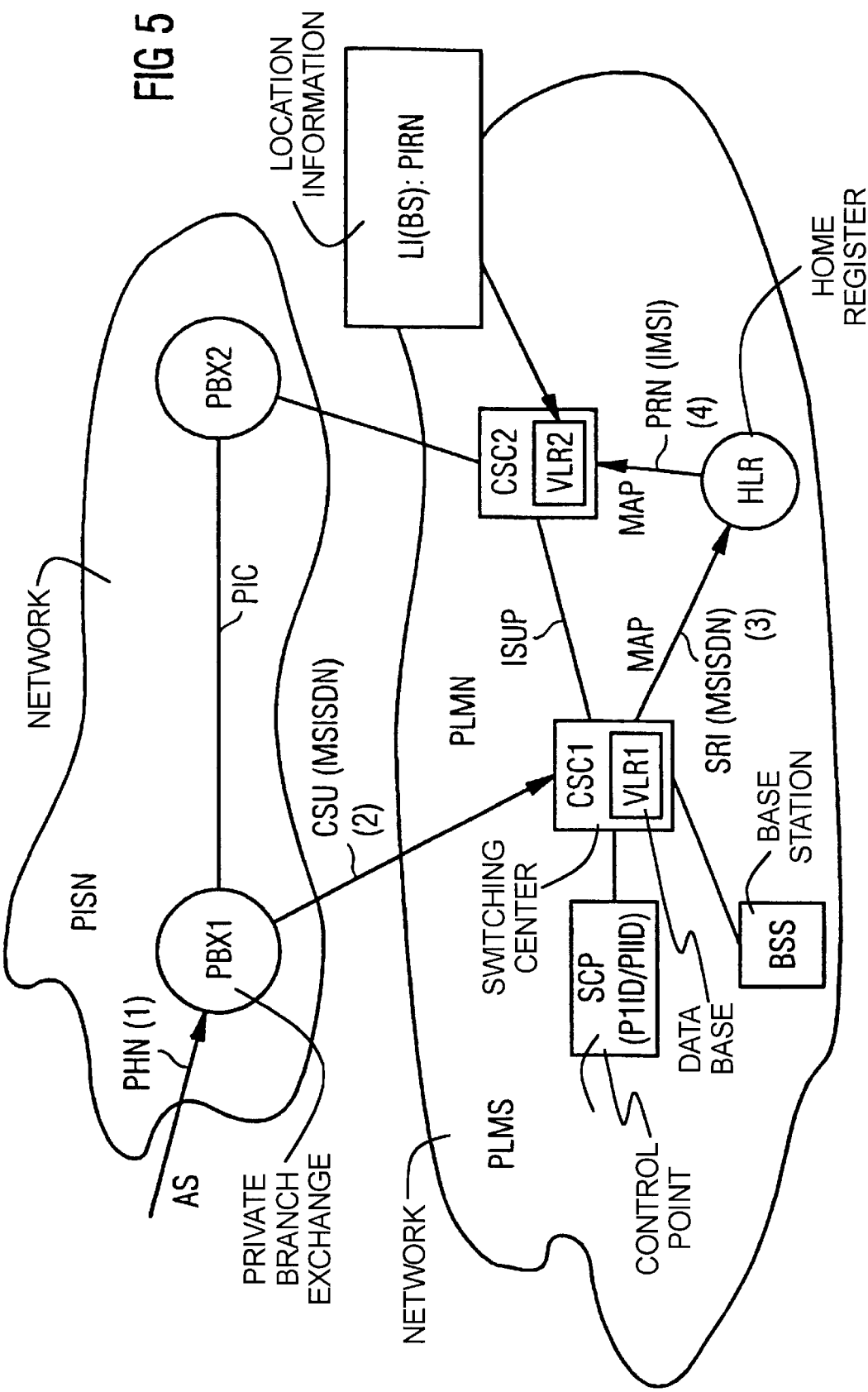
FIG. 5 depicts a block circuit diagram showing the execution for the routing for a call registered in the private network for a called subscriber that is directed into the public mobile radio telephone network with service control unit.

FIG. 5 shows the block circuit diagram for the execution for routing according to the block circuit diagram of FIG. 2, supplemented by the service control point SCP. The cases-of call forwarding that are shown in FIG. 2 and discussed in the appertaining Figure description are thereby omitted in order to avoid repetitions. The involvement of the service control point SCP, of course, is also possible in these cases. The service control point SCP engaged in the connection setup assigns the identification number PIID for the appertaining private network PISN to the identification number P1ID for the private branch exchange means PBX1. The routing on the basis of the call registered in the private branch exchange means PBX1 ensues in the same way as indicated in FIG. 2, composed of method steps (1) through (4).

Figure 6:
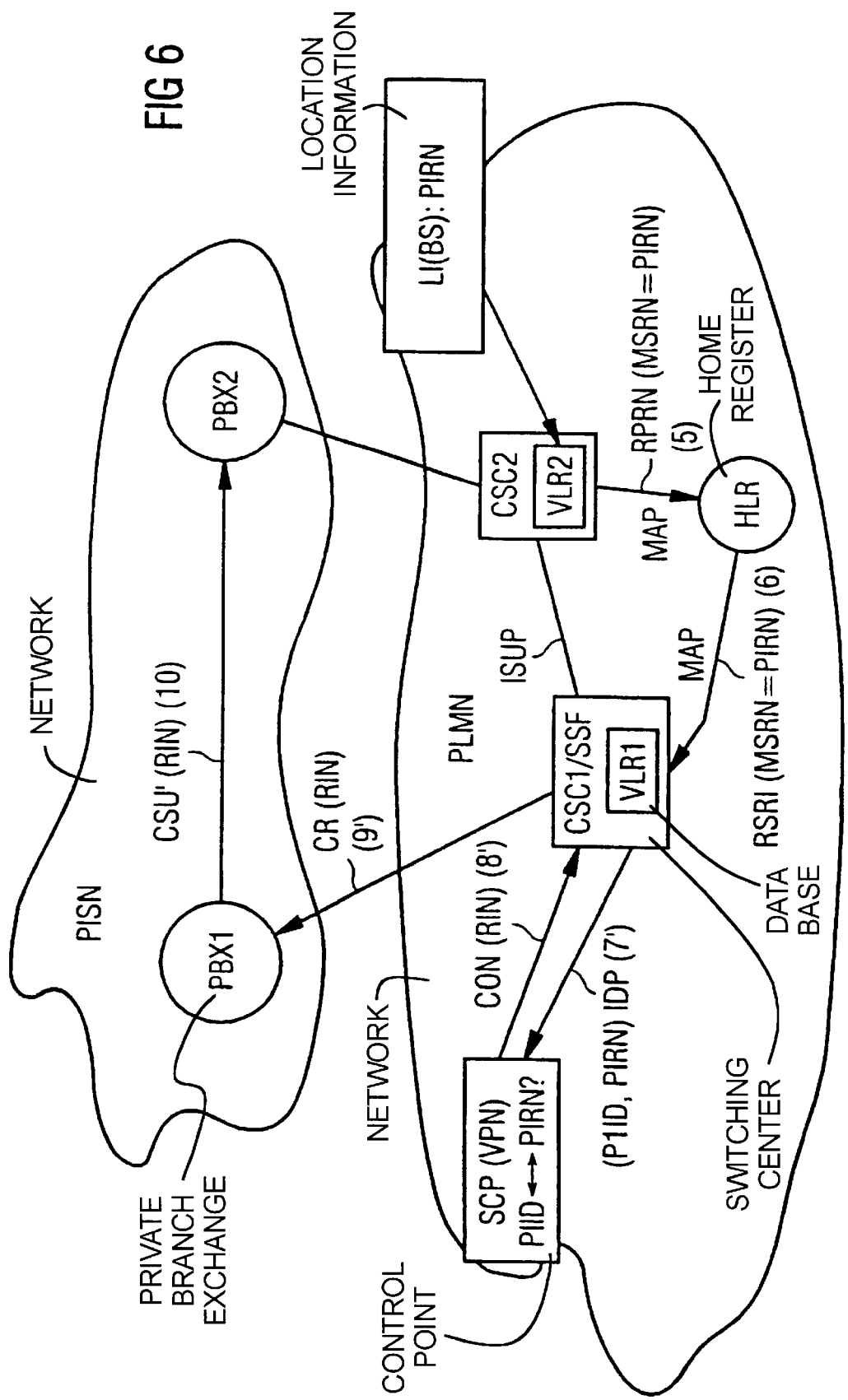
FIG. 6 depicts a block circuit diagram showing the execution for the routing given connection setup to a call destination that lies in the same private network, given involvement of the service control unit.

In a block circuit diagram, FIG. 6 shows the continuation of the execution for routing according to method steps (5) and (6), which are likewise described for FIG. 3. The mobile switching center CSC1 that is connected to the service control part SCP via the application part INAP represents a service switching point SCP. The service switching unit [sic] SSP thereby functions as a service access and service execution point in the intelligent network controlled by the service control point SCP. The involvement of the service control point SCP serves the purpose of checking the private branch exchange means PBX1 and PBX2 effected by the call in the private network PISN for affiliation to the same network. The involvement of the service control point SCP ensues such that, given a call incoming in the mobile radio telephone network PLMN with transmission of the mobile subscriber telephone number (MSISDN according to FIG. 5), the message RSRI is received (6) by the mobile switching center CSC1. Subsequently, the service control point SCP compares the identification number PIID it assigned to the routing number PRIN received in the message RSRI and determines that the private branch exchange means PBX1 registering the call to the B-subscriber and the private branch exchange means PBX2 of the call destination lie in the same private network PISN. The identification number P11D of the private branch exchange means PBX1 and the routing number PIRN are transmitted (7') to the service control point SCP in a message IDP (initial detection point) from the mobile switching center SCS1 acting as service switching point SSP. After analysis of the information that has been received and reviewed for identity of the private network by comparing numbers, the service control point SCP sends the routing information RIN back to the mobile switching center CSC1 in a message CON (connect) (8'). Over and above this, the message CON contains an information for the mobile switching center CSC1 to clear down (release) the call in the public mobile radio telephone network, i.e. the connection to the private branch exchange means PBX1. A message CR (call release) with the routing information RIN is therefore returned to the private network PISN in a fashion identical to FIG. 3 (9'), the connection setup ensuing directly within the private network PISN therein by sending the message CSU' between the private branch exchange PBX1 and the private branch exchange means PBX2, ensuing on the basis of the routing information RIN (10).

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for routing in a connection setup for calls between a first subscriber and a second subscriber, comprising the steps of:

initiating a call by the first subscriber by selecting a telephone number and directing the call to the second subscriber who moves between coverage areas of mobile switching centers of a public mobile radio telephone network and areas of private branch exchanges of at least one private network and who uses at least one radio telephone subscriber station for receiving and transmitting calls;

setting up a connection to a first private branch exchange of the private network based on the selected telephone number and transmitting a mobile radio telephone subscriber telephone number from the private branch exchange to the public mobile radio telephone network;

storing at least one identification number for identification of the private network in the public mobile radio telephone network for access to the first private branch exchange;

compiling a routing number in the public mobile radio telephone network based on the arriving mobile radio telephone subscriber telephone number and checking the routing number with reference to the stored identification number to determine if a call destination lies in an area of a private branch exchange of the same private network to which the first private branch exchange belongs; and sending given identity of the private network for the first private exchange and for the private branch exchange of the call destination, the call, if cleared down in the public mobile radio telephone network, and sending routing information that define the call destination to the first private branch exchange of the private network, the connection to the call destination in the private network being set up based on said routing information.

2. The method according to claim 1, wherein the routing number has at least an identification number for identification of the private network in which the private branch exchange of the call destination lies.

3. The method according to claim 2, wherein the routing number additionally has an identification number for identification of the private branch exchange of the call destination and an identification number for identifying the connection part of the private branch exchange.

4. The method according to claim 1, wherein the routing information has an identification number for identifying the private branch exchange of the call destination and an identification number for identifying a connection port of the private branch exchange of the call destination.

5. The method according to claim 1, wherein location information that indicates how the subscriber is reachable in an area of a private branch exchange of the private network is stored in the public mobile radio telephone network for the called subscribed and is employed as routing number for a comparison to the stored identification number with respect to identity of the private network for the first private branch exchange and for the private branch exchange registering the called subscriber.

6. The method according to claim 1, wherein, due to a call forwarding that is respectively set for the call subscriber and defines a call destination in the private network, the routing number is employed for a comparison to the stored identification number in view of identity of the private network for the first private branch exchange and for the private branch exchange of the call destination.

7. The method according to claim 6, wherein, due to an unconditional call forwarding that effects an immediate forwarding of the call or due to a call forwarding given an unreachable subscriber the routing number is employed for the comparison to the identification number.

8. The method according to claim 1, wherein a mobile switching center registering access to the first private branch exchange implements the check with respect to identity of the private network for the first private branch exchange and for the private branch exchange of the call destination and, given identity, transmits the routing information to the first private branch exchange.

9. The method according to claim 1, wherein the check with respect to identity of the private network for the first private branch exchange and for the private branch exchange of the call destination is implemented by a service control point of an intelligent network that is linked into the public mobile radio telephone network by connection to at least one mobile switching center, and wherein, given identity, a mobile switching center registering access to the first private branch exchange is informed to transmit the routing information to the private branch exchange.

10. The method according to claim 9, wherein a respective identification number for identifying the private exchange, and identification number is for identifying the respective private network is allocated for every private network by the service control point.

11. The method according to claim 10, wherein the identification numbers for identification of the private branch exchange are taken from the number area of the mobile radio telephone subscriber telephone numbers assignable in the public mobile radio telephone network.

12. The method according to claim 1, wherein for mobility, the called subscriber employs a combined radio telephone subscriber station with which the subscriber is automatically registered in supply areas of mobile switching centers of the public mobile radio telephone network and in areas of the private branch exchange of the private network.

13. A system for routing in the connection setup for calls between a first subscriber and a second subscriber, a call being initiated by the first subscriber by selecting a telephone number and being directed to the second subscriber who moves between coverage areas of mobile switching centers of a public mobile radio telephone network and areas of private branch exchange of at least one private network and uses at least one radio telephone subscriber station for receiving and transmitting the calls, comprising:

means in the private network for setting up a connection to a first private branch exchange based on a selected telephone number and for sending a mobile subscriber telephone number from the private branch exchange to the public mobile radio telephone network;

means in the public mobile radio telephone network for storing at least one identification number with which the private network is identified for access to the private branch exchange of the private network;

means in the public mobile radio telephone network for offering a routing number based on the incoming mobile radio telephone subscriber telephone number and means for checking a routing number with reference to the stored identification number as to whether the call destination lies in an area of a private branch exchange of a same private network to which the first private branch exchange belongs;

means in the public mobile radio telephone network for clearing down the call given identity of the private network for the first private branch exchange and for the private branch exchange of the call destination, and for sending routing information that define the call destination to the first private branch exchange the private network, which sets up the connection to the call destination in the private network based on the routing information.

14. The system according to claim 13, wherein the system further comprises a mobile switching center in the public mobile radio telephone network registering accesses to the first private branch exchange for checking the identity of the private network by comparing the routing number to the identification number.

15. The system according to claim 13, wherein the system further comprises, for checking the identity of the private network by comparing the routing number to the identification number, a service control point of an intelligent network that is respectively linked into the public mobile radio telephone network by connection to at least one mobile switching center, and, given identity, informs a mobile switching center registering access to the first private branch exchange to transmit the routing information to the private branch exchange.

* * * * *